W. H. CRANDALL.
TOWING HOOK.
APPLICATION FILED MAY 17, 1922.
1,435,587.
Patented Nov. 14, 1922.
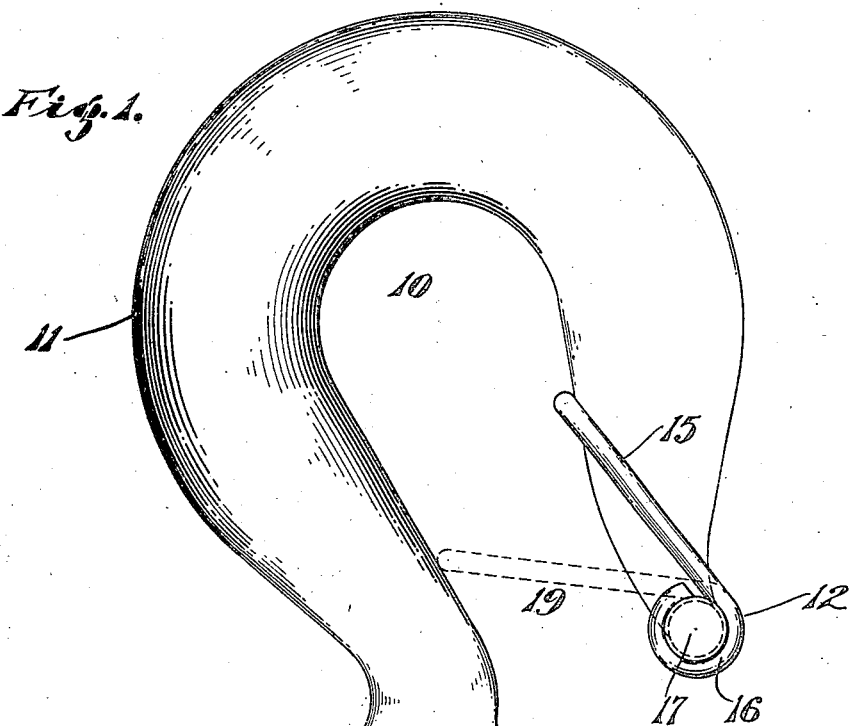
Fig. 1.
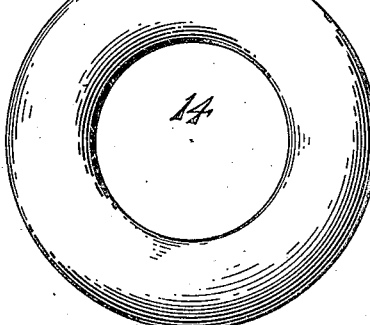
Fig. 2.
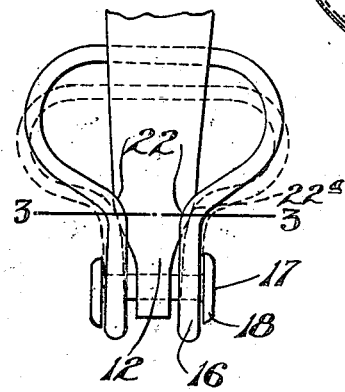
Fig. 3.
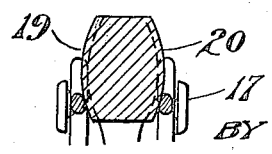
INVENTOR
WILLIAM H. CRANDALL
BY
ATTYS.

Patented Nov. 14, 1922.

1,435,587

UNITED STATES PATENT OFFICE.

WILLIAM H. CRANDALL, OF MENLO PARK, CALIFORNIA.

TOWING HOOK.

Application filed May 17, 1922. Serial No. 561,581.

*To all whom it may concern:*

Be it known that I, WILLIAM H. CRANDALL, a citizen of the United States, residing at Menlo Park, county of San Mateo, and State of California, have invented new and useful Improvements in Towing Hooks, of which the following is a specification.

This invention relates to towing hooks of the class adapted for use in connection with rope and chain tackle.

It is the object of the present invention to provide a simple and improved form of latch for a hook capable of being locked in open or closed position.

The invention contemplates the use of a hook provided with a latch member pivotally mounted on the lip of the hook and movable across the throat of the hook to open or close the latter. The mounting of the latch member is such as to yieldingly maintain the same in a set position, either entirely closing the throat of the hook or in open position permitting a rope or chain to be passed therethrough, regardless of the position of the hook. Tow hooks have heretofore been provided with gravity operated latches, but the same are unsuited for uses where the hook is likely to assume an inverted position when in use.

One form which the invention may assume is exemplified in the following description and illustrated by way of example in the accompanying drawings, in which:

Fig. 1 is a side elevation of a device embodying the invention.

Fig. 2 is a fragmentary view disclosing the mounting of the latch member.

Fig. 3 is a fragmentary view in section taken on line 3—3 of Fig. 2, showing certain details of construction.

Referring more particularly to the drawings, 10 generally indicates a hook of suitable proportions and design. The structure consists of a shank portion 11 formed with a lip 12 and an eye 14. Pivotally mounted on the lip 12 is a latch member 15, which is preferably formed of steel spring wire. This member as shown in Fig. 2 is formed in the shape of a bail, the ends of which are bent to form eyelets 16 by which the latch is pivotally connected to the lip of the hook by a rivet or pivot pin 17. This pin as shown in Fig. 2 passes through the eyelet 16 and the lip 12 and is provided with enlarged heads 18 which serve as collars to maintain the latch in position. The latch extends within the throat of the hook and is adapted to be moved from a position in contact with lip to a position in contact with the shank.

One of the important features of the present invention, is the peculiar mounting of the latch member 15. This mounting maintains the latch member in a set position either across the throat of the hook or in a position to permit the passage of rope or chain therethrough. This mounting is more clearly shown in Figs. 2 and 3. It will be seen by referring to these figures that a pair of cam surfaces 19 and 20 are formed on the shank of the hook adjacent the lip 12. These cam surfaces are engaged by curved portions 22 of the latch member. When the latch member is in open or closed position, the curved portions 22 thereof will be in engagement with the low points of the cam surfaces. However, when the position of the latch member is to be changed, the curved portions 22 will engage the rise of the cam surfaces 19 and 20, consequently the latch member will be sprung outwardly as shown in dotted line in Fig. 2 as at 22ª. It is thus obvious that as the latch member reaches either extremity of its movement it will snap in position and will there be held due to the spring in the metal of which it is formed, until its position is manually changed.

As before stated this feature is important as it permits the hook to be positioned at any desired working angle, with the assurance that the latch will at all times maintain its set position.

It is seen that the device here disclosed while simple in construction and inexpensive to manufacture will positively prevent accidental disengagement of a rope bight or a chain link from the hook, regardless of the position of the latter.

While I have shown the preferred form of the invention, it is to be understood that various changes in form, construction and arrangement of parts may be made by those skilled in the art without departing from the spirit of the invention as claimed.

Having thus described my invention what I claim and desire to secure by Letters Patent is:

1. A hook having a throat and a lip, a bifurcated latch member pivotally connected to opposite sides of the lip and extending within the throat, and cam surfaces formed on the hook adjacent the lip and engageable with the latch whereby the latter will be yieldingly retained in either an obstructing or in an unobstructing position within the throat.

2. A hook formed with a throat and a lip, a bifurcated latch member pivotally connected to opposite sides of the lip and extending within the throat, said latch being formed of spring material, and cam surfaces formed on the hook shaped to engage with the sides of the latch, to co-operate therewith whereby the latch will be yieldingly retained either in an obstructing, or in an unobstructing position within the throat.

3. In combination with a hook formed with a throat and a lip, of a latch member pivotally mounted on the lip and extending within the throat, said latch being formed of spring wire bent in the shape of a bail, the ends of which are bent to form eyelets whereby the latch may be pivotally connected to said lip, the eyelets being positioned one at each side of the lip, and cam surfaces formed on the lip of the hook for engagement with the sides of the latch member whereby the latter may be maintained either in a position to close the throat of the hook or in a position where the throat will be unobstructed.

WILLIAM H. CRANDALL.